United States Patent
Li et al.

(10) Patent No.: US 12,190,629 B2
(45) Date of Patent: Jan. 7, 2025

(54) DEEP LEARNING BASED FINGERPRINT MINUTIAE EXTRACTION

(71) Applicant: THALES DIS FRANCE SAS, Meudon (FR)

(72) Inventors: Songtao Li, Austin, TX (US); Amit Pandey, Austin, TX (US)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 17/501,044

(22) Filed: Oct. 14, 2021

(65) Prior Publication Data

US 2023/0119918 A1 Apr. 20, 2023

(51) Int. Cl.
*G06V 40/12* (2022.01)
*G06F 18/21* (2023.01)
(Continued)

(52) U.S. Cl.
CPC ...... *G06V 40/1353* (2022.01); *G06F 18/2113* (2023.01); *G06F 18/214* (2023.01); *G06F 18/2163* (2023.01); *G06N 3/08* (2013.01); *G06T 5/20* (2013.01); *G06T 5/90* (2024.01); *G06V 10/50* (2022.01); *G06V 10/82* (2022.01); *G06V 20/20* (2022.01); *G06V 40/1359* (2022.01);
(Continued)

(58) Field of Classification Search
None
See application file for complete search history.

(56) References Cited

U.S. PATENT DOCUMENTS

| | | | |
|---|---|---|---|
| 10,846,568 | B2 | 11/2020 | Ko et al. |
| 11,074,495 | B2 | 7/2021 | Zadeh et al. |

(Continued)

FOREIGN PATENT DOCUMENTS

| | | | | |
|---|---|---|---|---|
| CN | 108717693 | | 4/2018 | |
| CN | 109214246 | A * | 1/2019 | ........... G06K 9/0008 |

(Continued)

OTHER PUBLICATIONS

Tang Y, Gao F, Feng J. Latent fingerprint minutia extraction using fully convolutional network. In2017 IEEE International Joint Conference on Biometrics (IJCB) Oct. 1, 2017 (pp. 117-123). IEEE. (Year: 2017).*

*Primary Examiner* — Emily C Terrell
*Assistant Examiner* — Nathan J Bloom

(57) ABSTRACT

Provided is a computer-implemented deep-learning-based method for extracting minutiae from a latent friction ridge image. The method comprises training a minutiae extraction model though a deep-learning network with ground truth latent friction ridge images as training samples, and, inputting a latent friction ridge image into the minutiae extraction model to extract minutiae of the latent friction ridge image, wherein the model outputs locations and directions for the extracted minutiae. The deep-learning network includes a base network configured to generate a minutiae feature map from a latent friction ridge image, a Region Proposal Network (RPN) configured to propose minutiae locations and directions from the minutiae feature map, and a Region-Based Convolutional Neural Network (RCNN) configured to definitely decide minutiae locations and directions from RPN's proposal.

6 Claims, 1 Drawing Sheet

(51) Int. Cl.
  *G06F 18/2113* (2023.01)
  *G06F 18/214* (2023.01)
  *G06N 3/08* (2023.01)
  *G06T 5/20* (2006.01)
  *G06T 5/90* (2024.01)
  *G06V 10/50* (2022.01)
  *G06V 10/82* (2022.01)
  *G06V 20/20* (2022.01)

(52) U.S. Cl.
  CPC .................. *G06V 40/1376* (2022.01); *G06T 2207/20021* (2013.01); *G06T 2207/20192* (2013.01); *G06T 2207/20221* (2013.01); *G06T 2207/30196* (2013.01)

(56) References Cited

U.S. PATENT DOCUMENTS

| | | | | |
|---|---|---|---|---|
| 2005/0163394 | A1* | 7/2005 | Scholze | G06V 40/1347 382/260 |
| 2006/0165264 | A1* | 7/2006 | Saitoh | G06V 40/103 382/115 |
| 2006/0190836 | A1* | 8/2006 | Ling Su | G06F 3/04166 715/773 |
| 2018/0204111 | A1* | 7/2018 | Zadeh | G06V 10/764 |
| 2019/0294864 | A1 | 9/2019 | Chabanne et al. | |
| 2019/0385056 | A1 | 12/2019 | Girard et al. | |
| 2020/0042831 | A1 | 2/2020 | Lee et al. | |
| 2020/0125824 | A1* | 4/2020 | Mabyalaht | G06N 3/08 |
| 2021/0166092 | A1* | 6/2021 | Mabyalaht | G06V 30/194 |
| 2021/0264566 | A1 | 8/2021 | Yu et al. | |
| 2022/0391760 | A1* | 12/2022 | Fedulova | G06N 20/20 |
| 2023/0077692 | A1* | 3/2023 | Onoro-Rubio | G06N 3/0455 706/25 |
| 2024/0005695 | A1* | 1/2024 | Di | G06V 10/80 |

FOREIGN PATENT DOCUMENTS

| | | | | |
|---|---|---|---|---|
| CN | 111027605 | | 11/2019 | |
| CN | 111898400 | A * | 11/2020 | |
| CN | 112257688 | A * | 1/2021 | ......... G06V 40/1382 |
| CN | 112257697 | A * | 1/2021 | ............ G06N 3/045 |
| CN | 113221844 | | 8/2021 | |

\* cited by examiner

DEEP LEARNING BASED FINGERPRINT MINUTIAE EXTRACTION

TECHNICAL FIELD

The present invention relates to a system and method for noise-robust friction ridge impression minutiae extraction from the digital signal using a fully convolutional feed-forward neural network.

BACKGROUND

Fingerprints, palm prints, and other biometric data, in particular, friction ridge data or images are used by many government, commercial, residential or industrial entities for a variety of purposes. These purposes include, merely by way of illustration, identifying individuals at border locations, confirming identity for purposes of access control or authentication, and forensic investigations using biometric data left at the scene of a crime.

Latent friction ridge images, especially latent fingerprints (FPs), are laden with a lot of noise and quality issues. Legacy minutiae extraction methods face the challenge of false minutiae extraction because of high noise in the latent FPs, as it is very difficult to model the variability in the noise and the low quality that they come with.

Deep Learning-Based Minutiae Extraction Algorithm, through rigorous training and validation, learns to understand the difference between foreground and background much better as compared to the traditional computer-implemented or manually implemented methods. Such deep learning-based minutiae extraction algorithms are adapted to extract more true minutiae and less false minutiae, directly improving the matching results.

SUMMARY

The present invention aims at providing an improved computer-implemented deep-learning-based method for identifying minutiae from a latent friction ridge image to enhance accuracy and efficiency.

The invention enables to automatically identify friction ridge minutiae (e.g., Termination, Bifurcation, Lake, Independent ridge, Independent ridge, Point or island, Spur, Crossover, etc.) on a friction ridge image (e.g., fingerprint image, palmprint image) based on deep-learning methods. The invention is especially efficient to extract minutiae from latent fingerprint images of low quality.

In order to achieve the purpose, the invention provides a computer-implemented deep-learning-based method for extracting minutiae from a latent friction ridge image, the method comprising the following steps:

training a minutiae extraction model through a deep-learning network with ground truth latent friction ridge images as training samples,
wherein the deep-learning network comprises a base network configured to generate a minutiae feature map from a latent friction ridge image, a Region Proposal Network (RPN) configured to propose minutiae locations and directions from the generated minutiae feature map, and a Region-Based Convolutional Neural Network (RCNN) configured to fine-tune minutiae locations and directions proposed by RPN,
wherein the training samples have at least marked minutiae positions and directions, and
wherein the training samples comprise images of the same friction ridges rotated by different angles, and;

inputting a latent friction ridge image into the minutiae extraction model to extract minutiae of the latent friction ridge image, wherein the model outputs locations and directions for the extracted minutiae.

As known, it is very important to have a large amount of training data to train a neural network that is appropriate to identify (or extract) minutiae. However, latent friction ridge (e.g., fingerprint) images are limited resources. Latent friction ridge images with human-marked minutiae are even more limited to obtain.

The inventors found that if they only use minutia location data (e.g., xy) of the limited marked fridge friction images to train the deep-learning network, the minutiae identification result is not accurate enough.

As a result, the inventors have tried to expand the training data amount to enhance the training quality.

They considered that for a minutia there is not only location data but also direction or orientation data (e.g., d). For example, for a bifurcation, its direction is the one coming from the merge point to the middle orientation of the two merged lines. Methods for deciding minutiae direction are well known in the art and are thus not explained in detail in the present invention.

The inventors thought that, since the same training image can be presented with any possible angle (or direction) from 0 to 360°, providing training images rotated by different angles will greatly expand the training data amount to improve the performance of the deep learning network.

That is why it is essential for the invention to provide the deep-learning network with added training samples, which contain the same friction ridges but with different rotated angles.

This measure enables the deep-learning network to gain more knowledge about what does a direction really means for a minutia in order to improve the accuracy of the minutiae extraction results provided by the network.

According to a particular embodiment of the invention, the rotation angle applied to the training samples is configurable. For example, one training latent fingerprint image may be rotated by every 15° to obtain 24 training images each offering a set of minutiae location data xy and direction data d.

As a result, the amount of training data is greatly expanded by simply rotating the training images. It should be noted that the rotation angle is not limited by the invention. It can be any angle from 0° to 360°, configurable according to the actual training requirements.

In a particular embodiment of the invention, the method comprises a step of dividing the latent friction ridge image into blocks having a configurable window size. For example, the window size may be preferably configured to be 32×32 DPI (Dots Per Inch) for a latent fingerprint image of 500× 500 DPI.

It should be noted that the window size is not so limited and may be flexibly configured (e.g., 16×16 DPI, 64×64 etc.) according to the density of friction ridges of the latent friction ridge image. A larger window is more appropriate for analyzing loose friction ridges, while a smaller window is more efficient for identifying dense friction ridges.

In a particular embodiment of the invention, the method comprises a step of preprocessing the latent friction ridge image before inputting it into the minutiae extraction model. For example, the preprocessing step may be light balancing the image. Any other appropriate preprocessing steps such as image enhancement methods in image and frequency domain may be adopted to reduce noises on the latent image and improve the minutiae extraction efficiency.

In a particular embodiment of the invention, the method comprises a step of performing a majority voting for the extracted minutiae that are located within a predetermined range according to the minutiae direction, so that one or more minutiae having low votes are removed from the resulting output by the RCNN. This post-processing enables us to further improve the accuracy of the final result.

As a matter of fact, when the RCNN output the minutiae extraction result, it may output multiple minutiae sometimes at substantially the same location, for example, three minutiae within a range such as 12×12 DPI. These minutiae are considered to be located quite close to each other, or even overlapped with each other.

However, ultimately only one minutia needs to be kept for that location. In order to decide the "real" one, the system uses a majority voting mechanism to select the most possible "real" one from the three by taking into account their directions (or orientations) calculated by the system.

For example, if two of them are pointing in substantially the same direction and the third is pointing in another direction. The system may remove the third minutiae even if it may have a higher confidence score calculated by the system.

In a particular embodiment of the invention, there is a minutiae extraction system comprising a processor adapted to perform the steps of the method according to the invention.

In a particular embodiment of the invention, there is a computer program comprising instructions which, when the program is executed by a processor of a minutiae extraction system, cause the system to carry out the steps of the method according to the invention.

In a particular embodiment of the invention, there is a computer-readable storage medium comprising instructions which, when executed by the computer, cause the computer to carry out the steps of the method according to the invention.

The foregoing has outlined rather generally the features of one or more embodiments of the present invention so that the detailed description of the present invention that follows may be better understood. Additional features and advantages of the present invention will be described hereinafter which may form the subject of the claims of the present invention.

The advantages and features of the system and the computer program according to the embodiments of the present invention are the same as those of the above-described method and will not be repeated here.

BRIEF DESCRIPTION OF THE DRAWINGS

The accompanying drawings, which are incorporated in and constitute a part of this description, illustrate embodiments consistent with the invention and, together with the description, serve to explain the principles of the invention.

Specific embodiments in this invention have been shown by way of example in the foregoing drawings and are hereinafter described in detail. The figures and written description are not intended to limit the scope of the inventive concepts in any manner. Rather, they are provided to illustrate the inventive concepts to a person skilled in the art by reference to particular embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
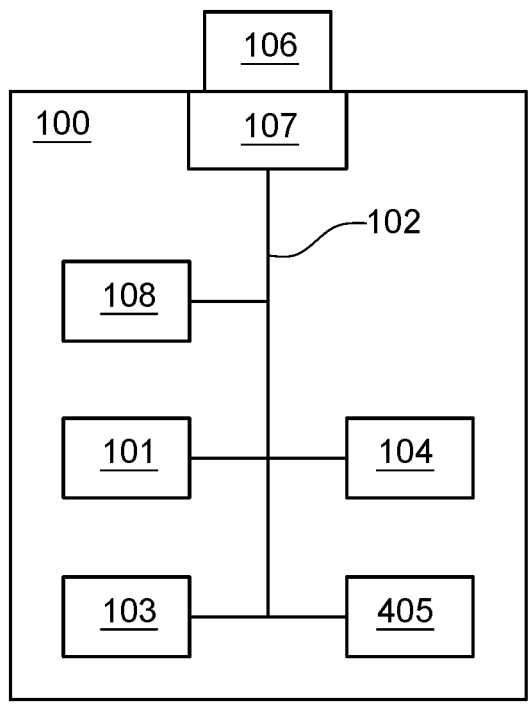
FIG. 1 represents a hardware configuration of a minutiae extraction system for practicing the principles of the present invention in accordance with an embodiment of the present invention.

FIG. 1 depicts a schematic hardware configuration of a minutiae extraction system 100 in accordance with a particular example. The system 100 may include a processor 101 connected via a bus 102 to a random access memory (RAM) 103, a read-only memory (ROM) 104, and/or a non-volatile memory (NVM) 105. The system 100 further includes a connector 106 connected to the processor and by which the system 100 may be connected to a communication module. Such a communication module may be used to connect the system 100 to various forms of wireless networks, e.g., wide-area networks, WiFi networks, or mobile telephony networks. Alternatively, the system 100 may connect to networks via wired network connections such as Ethernet. The system 100 may also include input/output means 107 providing interfaces to the user of the device, such as one or more screens, loudspeakers, a mouse, tactile surfaces, a keyboard etc.

The system 100 further comprises a memory 108 storing the method of the present invention. The system 100 may input latent friction ridge images to the processor 101 through the bus 102. The latent friction ridge images may be generated by program applications implemented within the system 100 itself or received by the system 100 from external devices via a wired or wireless telecommunication network.

The system 100 may receive minutiae extraction results output by the processor 101 from the latent friction ridge images when the processor 101 executes the method stored in the memory 108.

The system 100 may send the minutiae extraction results via a wired or wireless telecommunication network to devices or entities which need the minutiae extraction results to do further analysis.

Figure 2:
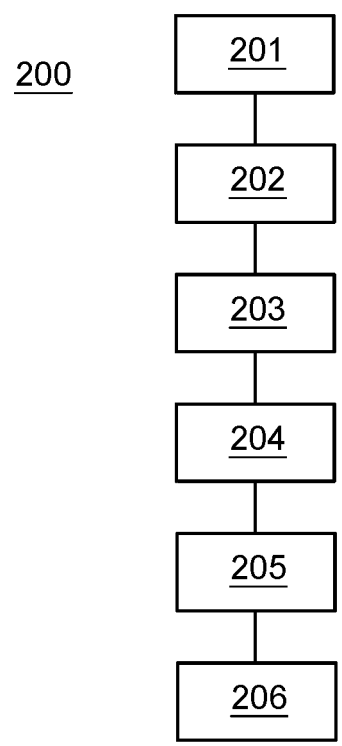
FIG. 2 illustrates a flowchart of a method performed by the minutiae extraction system of FIG. 1 in accordance with an embodiment of the present invention.

FIG. 2 illustrates a schematic process flow of a method 200 for extracting minutiae from a latent friction ridge image. The method may be implemented by the system 100 of FIG. 1.

The method mainly comprises two phases. The first is a training phase, and the second is a minutiae extraction (or prediction) phase.

During the training phase, the system may be provisioned with ground truth latent friction ridge images as training samples. In the current example, the training samples may be latent fingerprint images.

The training images may be stored in a database which is accessible by the system via a communications network or may be stored in a memory contained by the system.

The training samples may have at least marked minutiae locations and directions. In other words, each training image is associated with at least a set of minutiae data comprising coordinates x, y and directions d of the marked minutiae.

As mentioned above, the training data of the invention has been expanded by rotating the training images. That is, training samples comprise images of the same fingerprint but rotated with different angles.

In the current example, the same latent fingerprint image may be rotated by every 15° (i.e., by 15°, 30°, 45°, 60°, 75°, . . . , etc.) in order to augment the amount of training data for the system to improve the accuracy of the training result. The rotation angle may also be set flexibly. It can be any angle between 0° and 360°.

The system uses the expanded training data to train (201) a minutiae extraction (or identification) model through a deep-learning network utilized by the present invention.

The deep-learning network comprises a base network such as VGG16 or Resnet, which is configured to generate a minutiae feature map from an input latent friction ridge image.

The anchor window are used to divide the input image into blocks for feature identification. The window size may be 32×32 DPI for a 500 DPI latent fingerprint image in the current example. However, this window size may be adaptively changed (e.g., 16×16, 64×64, etc.) according to, for example, the size of the latent friction ridge image, the actual training requirement, etc.

The deep-learning network further comprises a Region Proposal Network (RPN) which takes the minutiae feature map generated by the base network and predicts (or proposes) whether there are minutiae and/or where they are in the input image block by block.

In other words, the RPN may identify the background (i.e., region with no minutiae) and foreground (i.e., region with minutiae) of the input latent image. The RPN may also calculate a preliminary result of locations (e.g., x, y coordinates) and directions (e.g., d) for the identified minutiae.

The deep-learning network further comprises a Region-Based Convolutional Neural Network (RCNN) which is adapted to receive the preliminary result calculated by the RPN and verifies it. The RCNN is responsible to check again the feature map based on the regions (e.g., foreground and background) proposed by the RPN, and decide again whether the region is a foreground or background and if it is a foreground, then where are the minutiae, with their orientations as well. In other words, the RCNN is adapted to fine-tune the minutiae locations and directions proposed by the RPN.

The final result output by the RNCC is compared with the marked minutiae data and feed back to the network to correct and adjust the minutiae extraction model.

As such, the model is trained through the deep-learning network end to end by minimizing the joint losses of the RPN and RCNN modules.

After the training phase, the extraction (or prediction) phase may be started.

During the extraction phase, a latent friction ridge image (e.g., fingerprint) for which the minutiae are to be extracted may be input (202) to the trained network (i.e., the trained minutiae extraction model).

Similar to the training phase, in the extraction phase, the anchor window used for the training is also applied to the input image so that the network may extract the minutiae feature block by block.

The input image is first received by the base network to generate a feature map.

The RPN may calculate a preliminary minutiae data set from the generated feature map. The data set may comprise locations (e.g., xy coordinates) and directions (e.g., d degrees) of the minutiae identified by the RPN from the feature map.

The RCNN may then re-calculate a final minutiae data set based on the regions proposed by the RPN and output the data set as a final extraction result.

As previously mentioned, when there are multiple minutiae extracted by the RCNN at substantially the same location, the system may decide to remove (203) one or more minutiae by majority voting the minutiae according to their directions.

If the majority of the close/overlapped minutiae have substantially the same direction, the minority of the minutiae are to be removed from the final result even if its confidence score is higher than the others.

The system may finally keep only one of the majority minutia with a higher confidence score.

Alternatively or additionally, the system may light balance (204) the input latent friction ridge image to even out the light on the image without causing a blocky issue. The system may calculate (205) again the minutiae data set for the input image with light balancing and finally use a modified Non-Max Suppression algorithm to fuse (206) the minutiae extracted from both calculated data sets to obtain a final minutiae data set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed, is:

1. A computer-implemented deep-learning-based method for extracting minutiae from a latent friction ridge image, the method comprising the steps of:

training a minutiae extraction model though a deep-learning network with ground truth latent friction ridge images as training samples, wherein the deep-learning network comprises a base network configured to generate a minutiae feature map from a latent friction ridge image, a Region Proposal Network (RPN) configured to propose minutiae locations and directions from the generated minutiae feature map at a given scale, and a Region-Based Convolutional Neural Network (RCNN) configured to fine-tune minutiae locations, and directions proposed by RPN, wherein the training samples have at least marked minutiae positions and directions, and wherein the training samples comprise images and marked minutiae of the same friction ridges each rotated by different angles;

preprocessing the latent friction ridge image by light balancing the image to produce a light-balanced latent friction ridge image;

inputting the latent friction ridge image and the light balanced latent friction ridge image into the minutiae extraction model to extract minutiae of the latent friction ridge image and the light balanced latent friction ridge image, wherein the model outputs sets of locations and directions for the extracted minutiae of each image; and fusing both sets of the extracted minutiae using a majority voting system, wherein the majority voting system uses a modified non-max suppression algorithm, wherein if a majority of proximal minutiae have substantially the same direction then the remaining minority proximal minutiae are removed irrespective of the confidence score of the remaining minority proximal minutiae, to obtain a final minutiae data set.

2. The method according to claim 1, wherein the method comprises a step of dividing the latent friction ridge image into blocks having a configurable window size.

3. The method according to claim 2, wherein the window size is 32 pixels×32 pixels for a latent fingerprint image of 500 DPI.

4. The method according to claim 1, wherein the rotation angle applied to the training samples is configurable.

5. The method according to claim 1, wherein the rotation angle is 15°.

6. The method according to claim 1, further comprising that the Region Proposal Network is configured to propose foreground/background classification from the generated minutiae feature map.

* * * * *